UNITED STATES PATENT OFFICE.

JOHN B. MOSZCZENSKI, OF NEW YORK, N. Y., ASSIGNOR TO TARTAR CHEMICAL COMPANY, OF JERSEY CITY, NEW JERSEY, A CORPORATION OF NEW JERSEY.

MANUFACTURE OF CREAM OF TARTAR.

1,000,433.

Specification of Letters Patent.   Patented Aug. 15, 1911.

No Drawing.   Application filed March 31, 1911.   Serial No. 618,128.

*To all whom it may concern:*

Be it known that I, JOHN B. MOSZCZENSKI, a citizen of the United States, residing in the borough of Brooklyn, city and State of New York, have invented new and useful Improvements in the Manufacture of Cream of Tartar, of which the following is a specification.

The invention relates to a new process for the manufacture of cream of tartar and has for its object the commercial production of cream of tartar from argols, lees, and similar material, to better advantage than by the processes heretofore practiced.

The process comprises the treatment of the crude material so that potassium tartrate and calcium tartrate are produced therefrom, the separation of the insoluble calcium tartrate from the soluble potassium tartrate, the changing of the calcium tartrate to free tartaric acid and the mixture of the free tartaric acid with the potassium tartrate resulting in the precipitation of cream of tartar. One of the advantages of the process is the purity of the cream of tartar thus obtained.

In obtaining the calcium tartrate and potassium tartrate from the crude materials and separating them from each other it is desirable to make a thin paste from the argols (or other crude material) and water, the amount of water necessary depending on the kind of argols. It is preferable to make this paste and accomplish the following reaction without applying heat and this may be done by using lime to decompose the bitartrate of potassium contained in the crude material into calcium tartrate and neutral potassium tartrate. The same result may, however, be accomplished by the use of other things, as, for example, carbonate of lime (chalk, whiting), and in case carbonate of lime is used it is better to apply heat. Having made a thin paste from the crude material and water, slaked lime, or its equivalent, is added, enough being used substantially to neutralize the potassium bitartrate contained in the crude material, the exact amount depending upon the nature of the argols. The result is that the bitartrate of potassium contained in the crude material is decomposed into calcium tartrate and neutral potassium tartrate. The potassium tartrate is soluble and the calcium tartrate is insoluble. The liquid is separated from the solid by pressing and washing, or in any other convenient way. Thus, from the crude material is obtained potassium tartrate in the form of liquid and dry calcium tartrate. The calcium tartrate is next changed to free tartaric acid by treatment with an appropriate acid. Preferably, the calcium tartrate is treated with sulfuric acid in any convenient way, as by making a paste of the calcium tartrate and water, or stirring the calcium tartrate in dilute sulfuric acid, which converts the calcium tartrate into calcium sulfate and free tartaric acid. The calcium sulfate is then separated from the free tartaric acid by pressing or other convenient way. Thus, from the crude materials are obtained potassium tartrate and free tartaric acid. An advantage of the process appears here. These two solutions can be bleached at this stage with good results. Preferably, that course is followed and it may be desirable to leave the potassium tartrate solution slightly acid in order to obtain the best results in such bleaching. The tartaric acid and potassium tartrate solutions are then mixed together in any convenient way, with the result that pure cream of tartar precipitates. If more of the tartaric acid than enough for precipitation is used in the mixture, some alkali may be added.

It will be observed that the process permits the final precipitation of the cream of tartar in the pure without the presence of other chemicals. The liquor left after the precipitation may be used again (to make the paste, etc., in repeating the process). Thus, the process produces cream of tartar of exceptional purity and without waste.

It is plain that at certain points in the process other chemicals may be substituted to do the work of those I have mentioned. For example, although lime is preferable, carbonate of lime and, at great expense, such chemicals as barium hydrate or other hydrates of metals which form insoluble (or very sparingly soluble) salts with both sulfuric and tartaric acids might be used to obtain separately from the crude material insoluble tartrate and potassium tartrate, without departing from the scope of the invention in its broader aspects. So, too, other instrumentalities may be employed to obtain the tartaric acid from calcium tartrate, although the treatment by sulfuric acid is preferable.

I claim:—

1. A process of making cream of tartar comprising making a paste of material containing potassium bitartrate and water, treating the paste with lime to decompose the potassium bitartrate into potassium tartrate and calcium tartrate, separating the calcium tartrate from the potassium tartrate, treating the calcium tartrate with sulfuric acid to produce free tartaric acid, and mixing the tartaric acid with potassium tartrate to precipitate cream of tartar.

2. A process of producing cream of tartar comprising treating the materials containing potassium bitartrate with lime to produce therefrom potassium tartrate and calcium tartrate, treating the calcium tartrate with sulfuric acid to produce tartaric acid, and mixing the tartaric acid and potassium tartrate to precipitate cream of tartar.

3. A process of producing cream of tartar comprising treating crude materials containing bitartrate of potassium with a base to produce therefrom potassium tartrate and insoluble tartrate, treating the insoluble tartrate with sulfuric acid to obtain therefrom tartaric acid, and mixing the tartaric acid with the potassium tartrate to precipitate cream of tartar.

4. A process of producing cream of tartar comprising treating crude materials containing bitartrate of potassium with a base to obtain therefrom potassium tartrate and insoluble tartrate, making from the insoluble tartrate tartaric acid, and mixing the tartaric acid and potassium tartrate to precipitate cream of tartar.

5. A process of producing cream of tartar comprising treating crude materials containing bitartrate of potassium with lime to produce therefrom potassium tartrate solution and calcium tartrate, making from the calcium tartrate a tartaric acid solution, bleaching said solutions and mixing them together to precipitate cream of tartar.

6. A process of producing cream of tartar comprising adding to materials containing bitartrate of potassium a substance which with the potassium bitartrate produces substantially neutral potassium tartrate solution and calcium tartrate, treating the calcium tartrate with acid to obtain therefrom tartaric acid and mixing the tartaric acid and the potassium tartrate to precipitate cream of tartar.

7. A process of producing cream of tartar from crude material containing bitartrate of potassium comprising forming and separating potassium tartrate and calcium tartrate, making from the calcium tartrate tartaric acid, and mixing the tartaric acid and potassium tartrate to precipitate cream of tartar.

JOHN B. MOSZCZENSKI.

Witnesses:
HERMAN GUSTOW,
KATHRYN M. KILEY.